US012664262B2

(12) United States Patent
Chakankar et al.

(10) Patent No.: US 12,664,262 B2
(45) Date of Patent: Jun. 23, 2026

(54) UTILIZING PROGRESS IDENTIFIERS TO REWRITE AN EVENT QUERY

(71) Applicant: Cohesity, Inc., San Jose, CA (US)

(72) Inventors: Abhijit Chakankar, San Jose, CA (US); Pramesh Gupta, Rajnandgaon (IN); Vipin Vishvkarma, Bangalore (IN); Apurv Gupta, Bengaluru (IN)

(73) Assignee: Cohesity, Inc., Santa Clara, CA (US)

( * ) Notice: Subject to any disclaimer, the term of this patent is extended or adjusted under 35 U.S.C. 154(b) by 75 days.

(21) Appl. No.: 18/925,214

(22) Filed: Oct. 24, 2024

(65) Prior Publication Data

US 2025/0053646 A1     Feb. 13, 2025

Related U.S. Application Data

(63) Continuation of application No. 17/386,076, filed on Jul. 27, 2021, now Pat. No. 12,141,271.

(51) Int. Cl.
| | |
|---|---|
| *G06F 16/242* | (2019.01) |
| *G06F 16/245* | (2019.01) |
| *G06F 21/55* | (2013.01) |

(52) U.S. Cl.
CPC .......... *G06F 21/552* (2013.01); *G06F 16/242* (2019.01); *G06F 16/245* (2019.01); *G06F 2221/034* (2013.01)

(58) Field of Classification Search
CPC .... G06F 21/552; G06F 16/242; G06F 16/245; G06F 2221/034; G06F 16/24568; G06F 16/24534
USPC .......................................................... 726/23
See application file for complete search history.

(56) References Cited

U.S. PATENT DOCUMENTS

| | | | |
|---|---|---|---|
| 11,615,082 B1 | 3/2023 | Shrigondekar et al. | |
| 11,652,685 B2 | 5/2023 | Medam et al. | |
| 12,141,271 B2 * | 11/2024 | Chakankar | G06F 16/24534 |
| 12,197,431 B2 * | 1/2025 | Singh | G06F 17/40 |
| 2014/0236890 A1 | 8/2014 | Vasan et al. | |

(Continued)

FOREIGN PATENT DOCUMENTS

EP          2275954          4/2017

OTHER PUBLICATIONS

International Preliminary Report on Patentability from International Application No. PCT/US2022/037715 dated Jan. 18, 2024, 9 pp.

(Continued)

*Primary Examiner* — Taghi T Arani
*Assistant Examiner* — Pegah Barzegar
(74) *Attorney, Agent, or Firm* — Shumaker & Sieffert, P.A.

(57)          ABSTRACT

Events from one or more primary systems associated with one or more tenants are received. The received events are stored in a message queue. At least a portion of the events in the message queue are ingested for organization and storage in a data store. One or more progress identifiers associated with ingesting of the events in the message queue are tracked. An event query is received from an external system. The event query is rewritten into a first component query for the data store and a second component query for the message queue based at least in part on a progress identifier. A result of the first component query and a result of the second component query are combined to determine a result of the event query.

20 Claims, 5 Drawing Sheets

(56) References Cited

U.S. PATENT DOCUMENTS

| | | | |
|---|---|---|---|
| 2016/0088125 A1 | 3/2016 | Polychronis | |
| 2016/0203174 A1 | 7/2016 | Shahane et al. | |
| 2020/0050431 A1 | 2/2020 | Modghaddam et al. | |
| 2020/0334315 A1 | 10/2020 | Du | |
| 2021/0149751 A1 | 5/2021 | Ferstay et al. | |
| 2022/0382755 A1 | 12/2022 | Batsakis et al. | |
| 2023/0030246 A1* | 2/2023 | Chakankar | G06F 16/24534 |
| 2023/0143636 A1* | 5/2023 | Busjaeger | G06F 16/24552 |
| | | | 707/625 |
| 2024/0414170 A1* | 12/2024 | Loncaric | H04W 12/61 |
| 2025/0021420 A1* | 1/2025 | Sethi | G06F 11/0781 |
| 2025/0030778 A1* | 1/2025 | Shi | H04L 9/008 |
| 2025/0053646 A1* | 2/2025 | Chakankar | G06F 16/24534 |

OTHER PUBLICATIONS

International Search Report and Written Opinion of International Application No. PCT/US2022/037715 dated Oct. 7, 2022, 11 pp.
Krishnamurthy et al., "Continuous Analytics Over Discontinuous Strams", Proceedings of the 27th Annual International Conference on Mobile COmputing and Networking, Jun. 2010, 1081-1092 pp.
Prosecution History from U.S. Appl. No. 17/386,076, dated Feb. 7, 2022 through Jul. 16, 2024, 147 pp.
Sailesh Krishnamurthy et al., Continuous Analytics Over Discontinuous Streams, Proceedings of the 2010 Acm SIGMOD International Conference on Management of data, pp. 1081-1092, Jun. 2010 (Year: 201 0).

* cited by examiner

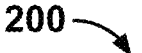
200
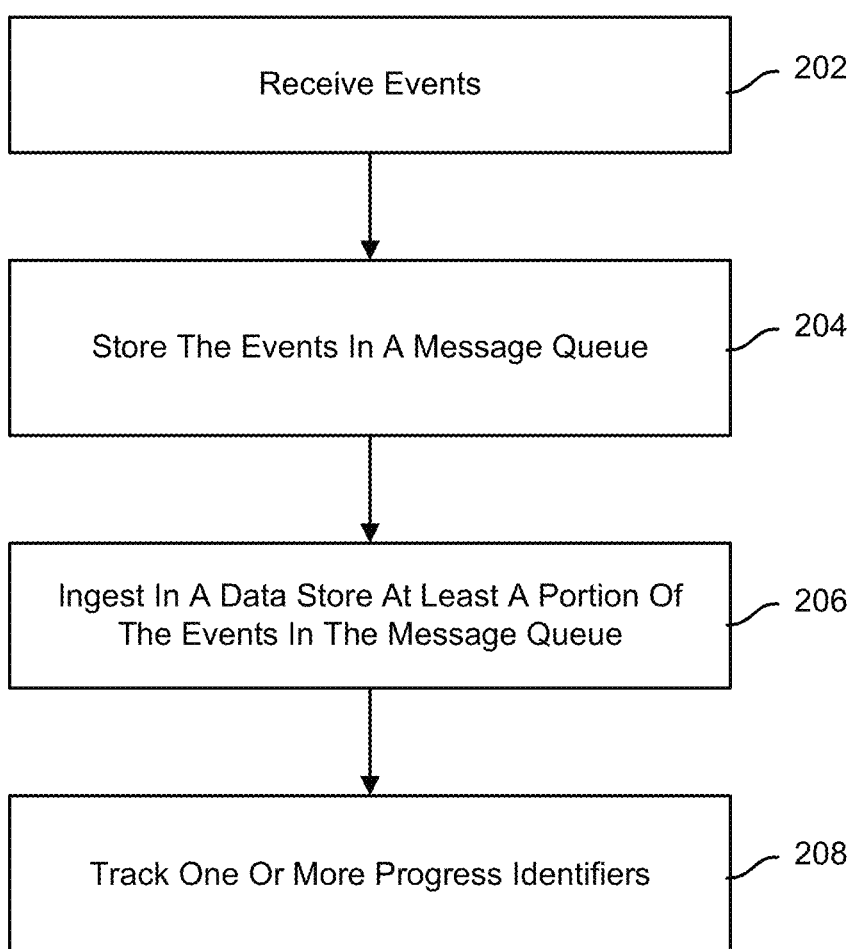
| Receive Events | 202 |
| Store The Events In A Message Queue | 204 |
| Ingest In A Data Store At Least A Portion Of The Events In The Message Queue | 206 |
| Track One Or More Progress Identifiers | 208 |
FIG. 2

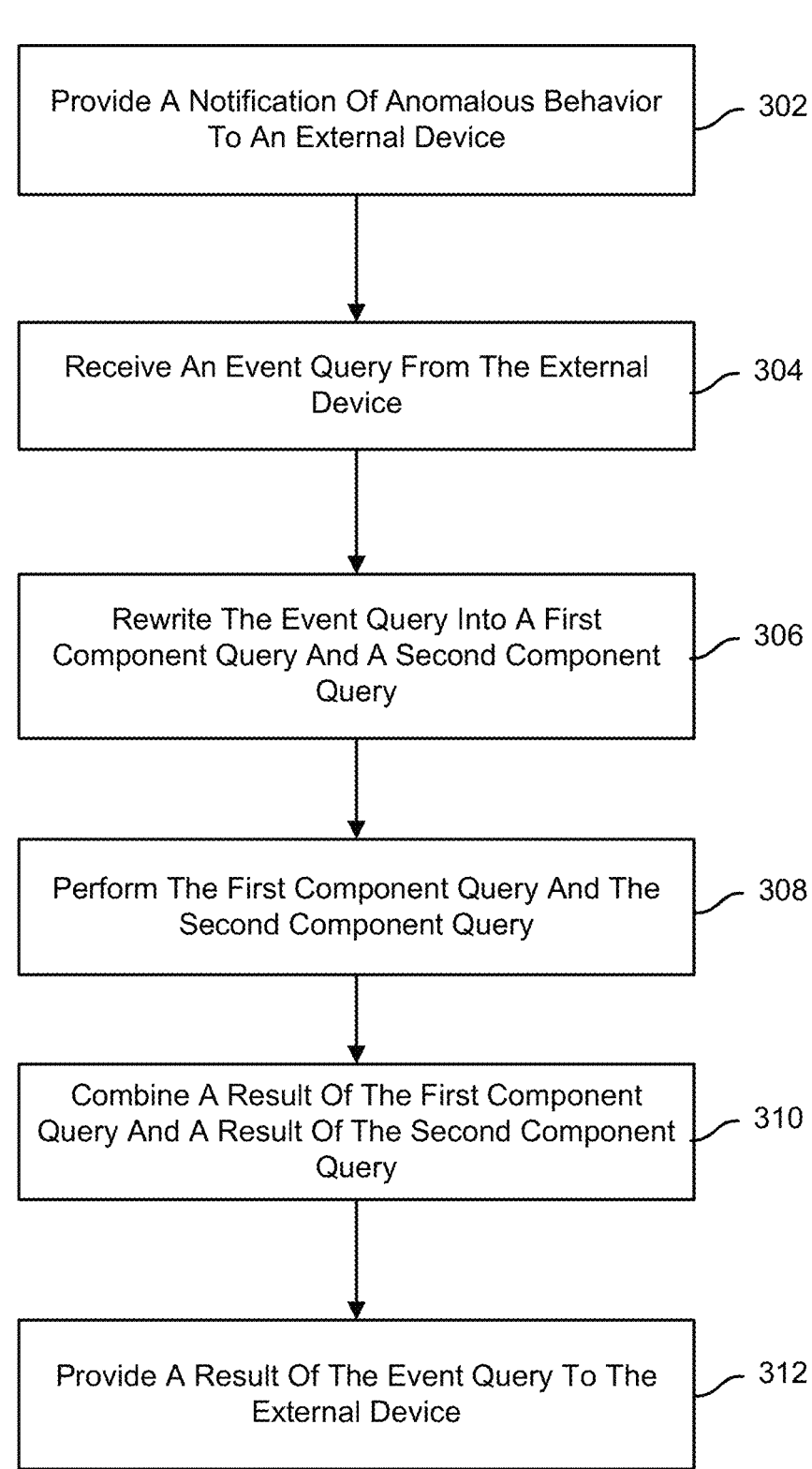

300

Provide A Notification Of Anomalous Behavior To An External Device — 302

Receive An Event Query From The External Device — 304

Rewrite The Event Query Into A First Component Query And A Second Component Query — 306

Perform The First Component Query And The Second Component Query — 308

Combine A Result Of The First Component Query And A Result Of The Second Component Query — 310

Provide A Result Of The Event Query To The External Device — 312

FIG. 3

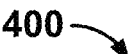

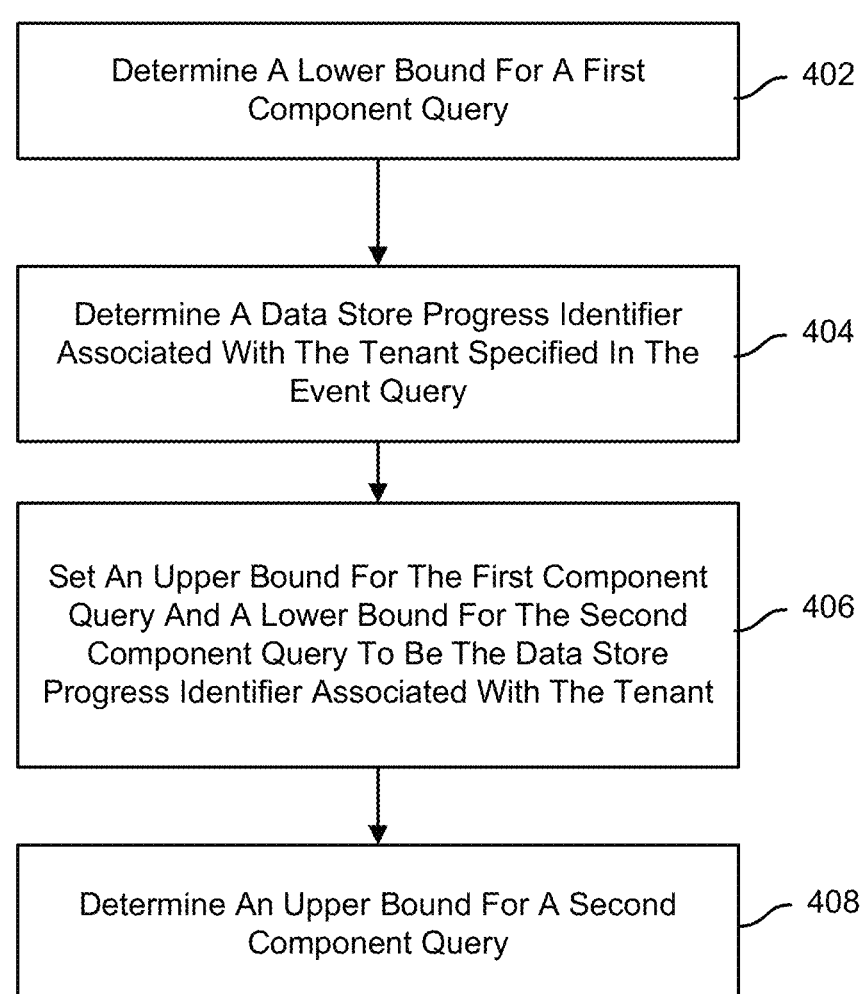

| Determine A Lower Bound For A First Component Query | 402 |

| Determine A Data Store Progress Identifier Associated With The Tenant Specified In The Event Query | 404 |

| Set An Upper Bound For The First Component Query And A Lower Bound For The Second Component Query To Be The Data Store Progress Identifier Associated With The Tenant | 406 |

| Determine An Upper Bound For A Second Component Query | 408 |

FIG. 4

UTILIZING PROGRESS IDENTIFIERS TO REWRITE AN EVENT QUERY

CLAIM OF PRIORITY

This application is a continuation of U.S. patent application Ser. No. 17/386,076, filed 27 Jul. 2021, the entire contents of which is incorporated herein by reference.

BACKGROUND

A primary system maintains an event log that stores a plurality of entries for a plurality of events. The event log may be updated when an object (e.g., file or directory) is accessed, modified, deleted, or created. The event log may also be updated for other events associated with the primary system, such as when a user logged in, the number of failed login attempts associated with a client device, each time a software update was performed, each time a password was changed, etc. A user may desire to determine whether there has been any anomalous activity at the primary system. However, the number of events stored in the event log may be too voluminous to determine whether there has been any anomalous activity in a timely manner.

BRIEF DESCRIPTION OF THE DRAWINGS

Various embodiments of the invention are disclosed in the following detailed description and the accompanying drawings.

FIG. 2 is a flow diagram illustrating an embodiment of ingesting events into a data store.

FIG. 3 is a flow diagram illustrating an embodiment of a process for responding to an event query.

FIG. 4 is a flow diagram illustrating an embodiment of a process for rewriting an event query.

DETAILED DESCRIPTION

Figure 1:
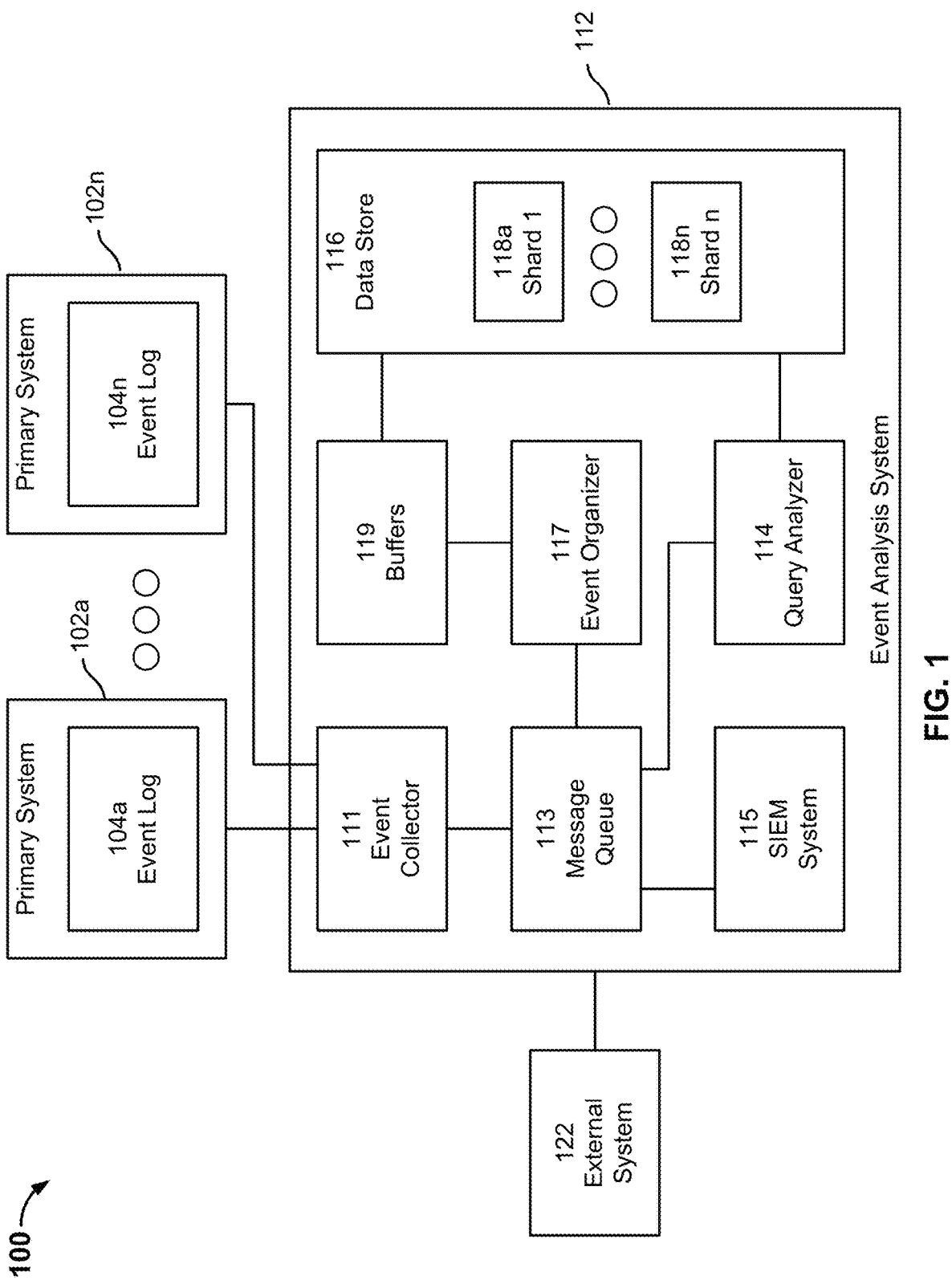
FIG. 1 is a block diagram illustrating an embodiment of a system for detecting anomalous activity.

A technique to identify one or more events that may be associated with anomalous activity is disclosed herein. One or more primary systems associated with one or more tenants are coupled to an event analysis system. A tenant may correspond to a user, an enterprise, a government, a company, a business unit within a company, an organization, etc. In some embodiments, one or more primary systems associated with a tenant are coupled to the event analysis system. In some embodiments, one or more corresponding primary systems associated with a plurality of different tenants are coupled to the event analysis system. In some embodiments, the event analysis system is coupled to a plurality of different tenants, each tenant being associated with one or more corresponding primary systems.

Each primary system includes a corresponding event log that includes a plurality of entries. Each entry identifies an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, etc. Examples of event attributes include a timestamp, a sequence number, a user to which the event is associated, an object (e.g., file, directory) to which the event is associated, a location, etc. A primary system may include an anomalous activity detection system that analyzes the entries included in an event log to detect anomalous activity. However, such an anomalous activity detection system utilizes the primary system's CPU resources. The primary system is configured to execute one or more primary processes (e.g., database, production system, etc.). When executing its anomalous activity detection algorithm, the anomalous activity detection system utilizes the primary system's CPU resources that could be used for the one or more primary processes. This may reduce the overall performance of the one or more primary processes.

An event analysis system is coupled to a primary system and receives events from the primary system. The event analysis system analyzes the received events to detect anomalous activity. This enables anomalous activity on the primary system to be detected without reducing the overall performance of the one or more primary processes running on the primary system. The event analysis system includes an event collector. In some embodiments, the event collector sends a request to a primary system for a set of events. In response, the primary system provides the requested set of events. In some embodiments, a primary system pushes one or more events to the event collector.

The event analysis system includes a message queue that is coupled to the event collector. The event collector stores the obtained events in the message queue. The events are stored in the message queue in the order in which they are obtained from the one or more primary systems. In some embodiments, the events associated with a plurality of different tenants are stored in the message queue. Events stored in the message queue are stored in the order in which they are received because a plurality of primary systems are concurrently providing events to the event analysis system. For example, the order of messages in the message queue may be a first event associated with the first primary system associated with a first tenant, a second event associated with a first primary system associated with a second tenant, a third event associated with a second primary system associated with the first tenant, a fourth event associated with the first primary system associated with the second tenant, and a fifth event associated with the first primary system associated with the first tenant. Events stored in the message queue may also be stored in the order in which they are received because the primary systems from which the events are received may provide the events at different times and/or the received events may correspond to different time intervals. For example, a first primary system may provide at 12:00 PM events that correspond to a time interval of 11:00 AM-12:00 PM and a second primary system may provide at 12:05 PM events that correspond to a time interval of 11:00 AM-11:30 AM. In this example, the events associated with the first primary system are stored in the message queue before the events associated with the second primary system.

The event analysis system includes a security information and event management (SIEM) system, an event organizer, and a query analyzer. The message queue is coupled to the SIEM system, the event organizer, and the query analyzer. The SIEM system analyzes events included in the message queue to detect anomalous activity. Examples of anomalous activity include a confidential file being accessed from a device associated with an unknown internet protocol (IP) address, a file being shared by a user with permission to access the file to one or more users without permission to access the file, a large number of files being deleted within a particular time period, etc. In response to detecting anomalous activity, the SIEM system provides to an external system (e.g., a client device, a SOAR (security orchestration, automation and response) device, etc.) a notification indicating that anomalous activity was detected.

The external system may provide the event analysis system an event query for one or more events that are associated with the detected anomalous activity. The event query may specify at least a start time, an end time, and a tenant (e.g., tenant id). In some embodiments, the event query also specifies one or more event attributes (e.g., location). In some embodiments, the event query also specifies one or more sub-tenants associated with the tenant. A sub-tenant may correspond to a department associated with the tenant, a user associated with the tenant, a group of individuals associated with the tenant, an organization associated with the tenant, etc.

The events in the message queue are not organized in a manner that enables the event analysis system to quickly identify the one or more events that satisfy the event query. The event analysis system includes an event organizer that ingests events in the message queue for organization and storage in a data store. Events are stored in the data store in a manner that enables the event analysis system to quickly identify at least a portion of the events that satisfy the event query.

The event analysis system includes a corresponding buffer for each tenant. The event organizer ingests and partitions the messages, and copies a set of one or more messages associated with a tenant from the message queue to a message buffer associated with the tenant. The event organizer analyzes the set of one or more messages in the message buffer associated with the tenant for storage in a data store. The data store includes a corresponding shard for each of the tenants. In some embodiments, the data store includes a corresponding shard for each of the sub-tenants associated with a tenant. The event organizer flushes messages from the buffer and stores the messages in the corresponding shard. This enables events associated with a particular tenant and/or sub-tenant to be easily identified and retrieved.

In response to receiving an event query from an external system, a query analyzer of the event analysis system rewrites the event query into a first component query and a second component query based at least in part on a progress identifier. The event analysis system tracks one or more progress identifiers. A first progress identifier may be a data store progress identifier that indicates a most recent event that is stored in a shard associated with a tenant or sub-tenant. The first progress identifier may be a timestamp, a sequence number, or any other identifier that indicates a sequence of an event with respect to other events. A second progress identifier may be an event attribute progress identifier that is associated with the one or more primary systems to which the event analysis system is coupled. The event attribute progress identifier indicates the oldest event having the event attribute that is in a message buffer for any of the tenants.

There is a delay from the time at which an event is stored in the message queue to the time at which the event is stored in a shard of the data store. The query analyzer utilizes the data store progress identifier to identify non-overlapping ranges of events (i.e., disjointed) that include one or more events associated with the query that are stored in the data store and to identify one or more events associated with the query that have yet to be stored in the data store. The first component query, when performed, identifies one or more events associated with the event query that are stored in the data store and the second component query, when performed, identifies one or more events associated with the event query that are stored in the message queue.

In some embodiments, the query analyzer queries the data store for one or more events associated with a tenant or sub-tenant specified in the query that occurred between the start time specified in the event query to the data store progress identifier associated with the tenant or sub-tenant. The query analyzer queries the message queue for one or more events associated with a tenant or sub-tenant specified in the query that occurred between the data store progress identifier associated with the tenant or sub-tenant and the end time specified in the event query. This reduces the amount of time and resources needed to respond to the event query because the query analyzer utilizes the data store to identify at least a portion of the events that satisfy the event query instead of solely relying on the message queue to identify all of the events that satisfy the event query. The amount of time and resources needed to identify one or more events that satisfy the event query from the data store is less than the amount of time and resources needed to identify one or more events that satisfy the event query from the message queue. In some embodiments, the data store query includes an event corresponding to the data store progress identifier associated with the tenant or sub-tenant and the message queue query excludes an event corresponding to the data store progress identifier associated with the tenant or sub-tenant. In some embodiments, the data store query excludes an event corresponding to the data store progress identifier associated with the tenant or sub-tenant and the message queue query includes an event corresponding to the data store progress identifier associated with the tenant or sub-tenant.

For example, an event query may request for events associated with tenant 1 having a start time of 12:00 PM and an end time of 2:15 PM. The data store progress identifier associated with tenant 1 may be 1:00 PM. In this example, the query analyzer sets the lower bound for the first component query to be 12:00 PM and the upper bound for the first component query to be 1:00 PM and sets the lower bound for the second component query to be 1:00 PM and the upper bound for the second component query to be 2:15 PM. Querying the data store for a portion of the events that occurred between 12:00 PM and 2:15 PM reduces the amount of time and resources to respond to the query because the query analyzer is not querying the message queue for all of the events that occurred between 12:00 PM and 2:15 PM.

In some embodiments, an event query includes an event attribute (e.g., location) in addition to a start time, an end time, and a tenant. The lower bound for a first component query is set to the start time included in the event query and the upper bound for a second component query is set to the end time included in the event query. The event analysis system tracks an event attribute progress identifier across the one or more primary systems to which the event analysis system is coupled. The event attribute progress identifier indicates the oldest event having the event attribute that is in a message buffer for any of the tenants. The query analyzer determines whether the event attribute progress identifier precedes the data store progress identifier associated with the tenant. In the event the event attribute progress identifier precedes the data store progress identifier associated with the tenant, the query analyzer rewrites the event query as described above.

However, in the event the event attribute progress identifier does not precede the data store progress identifier associated with the tenant, the query analyzer sets the lower bound for the second component query to be the event attribute progress identifier and sets an upper bound for the first component query to be the data store progress identifier associated with the tenant. The gap between the progress identifiers represents a time span where no events relevant to the query occurred. Accordingly, this reduces the number of events for which the query analyzer needs to query the message queue. As a result, the amount of time and resources needed to respond to an event query is reduced. The query analyzer queries the data store for one or more events associated with a tenant or sub-tenant specified in the query that occurred between the start time specified in the event query to the data store progress identifier associated with the tenant or sub-tenant. The query is inclusive of the data store query endpoints (e.g., the start time specified in the event query and the data store progress identifier associated with the tenant or sub-tenant). The query analyzer queries the message queue for one or more events associated with a tenant or sub-tenant specified in the query that occurred between the event attribute progress identifier and the end time specified in the event query. The query is inclusive of the message queue query endpoints (e.g., the event attribute progress identifier and the end time specified in the event query).

For example, the event query may request for events associated with tenant 1 having a start time of 12:00 PM, an end time of 2:15 PM (e.g., the current time), and an event attribute of location 1. The data store progress identifier associated with tenant 1 may be 1:00 PM (e.g., the last time events were flushed by the event organizer from the message buffer associated with tenant 1). The event attribute progress identifier of "location 1" may be 2:00 PM. This progress identifier is the progress identifier for the oldest event having the event attribute of "location 1" that is in a message buffer for any of the tenants (e.g., an event having an event attribute of "location 1" is in a message buffer for tenant 2). Thus, the lower bound for the second component query can be set to 2 PM instead of 1 PM because there are no events in the message buffer associated with tenant 1 from 1 PM to 2 PM that match the event query. The upper bound for the first component query can be set to 1 PM. In this example, the amount of time and resources needed to respond to the event query were reduced because the event analysis system did not need to query the message queue for events that occurred between 1 PM and 2 PM.

A result of the first component query and a result of the second component query are combined (e.g., a union) to determine a result of the event query. Subsequently, the event query result is provided to the external system. The event query result may provide evidence that the detected anomalous activity is suspicious to a user associated with the external system.

FIG. 1 is a block diagram illustrating an embodiment of a system for detecting anomalous activity. System 100 includes primary systems 102a, 102n, event analysis system 112, and external system 122.

Primary systems 102a, 102n may be a server, a virtual machine running on a computing device, a database running on a computing device, or any computing device that is capable of generating an event log. Although FIG. 1 depicts two primary systems, system 100 may include 1: n primary systems. In some embodiments, primary systems 102a, 102n are associated with a single tenant. A tenant may correspond to a user, an enterprise, a government, a company, an organization, etc. In some embodiments, primary systems 102a, 102n are associated with a plurality of different tenants. In some embodiments, event analysis system 112 is coupled to a plurality of different tenants, each tenant being associated with one or more corresponding primary systems.

Primary systems 102a, 102n include a corresponding event log 104a, 104n that includes a plurality of entries. Each entry identifies an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, etc. Examples of event attributes include a timestamp, a sequence number, a user to which the event is associated, an object (e.g., file, directory) to which the event is associated, etc.

Event analysis system 112 is coupled to primary systems 102a, 102n. Event analysis system 112 may be a server, a computing cluster, a virtual machine running on a computing device (e.g., a computer), a containerized application running on one or more computing devices, a cloud computing device, etc. Event analysis system 112 receives events from primary system 102a, 102n. Event analysis system 112 analyzes the received events to detect anomalous activity. Event analysis system 112 includes event collector 111. In some embodiments, event collector 111 sends a corresponding request to primary systems 102a, 102n for a set of events. In response, the primary systems 102a, 102n provide the requested set of events. In some embodiments, primary system 102a, 102n push a corresponding set of one or more events to event collector 111.

Event collector 111 stores the obtained events in message queue 113. The events are stored in message queue 113 in the order in which they are obtained from primary systems 102a, 102n. In some embodiments, the events associated with a plurality of different tenants are stored in message queue 113. The events stored in message queue 113 are associated with their own lifecycle and may be retained in message queue 113 until their corresponding lifecycle indicates they should be removed from message queue 113.

Events stored in message queue 113 are stored in the order in which they are received. Because a plurality of primary systems are concurrently providing events to event analysis system 112, the events may not be in the order in which they occurred on their respective systems. For example, the order of messages in message queue 113 may be a first event associated with the first primary system associated with a first tenant, a second event associated with a first primary system associated with a second tenant, a third event associated with a second primary system associated with the first tenant, a fourth event associated with the first primary system associated with the second tenant, and a fifth event associated with the first primary system associated with the first tenant.

Events stored in message queue 113 are also stored in the order in which they are received. Because the primary systems from which the events are received may provide the events at different times and/or the received events may correspond to different time intervals, the events may not be in the order in which they occurred on their respective systems. For example, primary system 102a may provide at 12:00 PM events that correspond to a time interval of 11:00 AM-12:00 PM and primary system 102n may provide at 12:05 PM events that correspond to a time interval of 11:00 AM-11:30 AM. In this example, the events associated with the primary system 102a are stored in the message queue before the events associated with primary system 102n.

Message queue 113 is coupled to a SIEM system 115, event organizer 117, and query analyzer 114. SIEM system 115 analyzes events included in message queue 113 to detect anomalous activity. Examples of anomalous activity include a confidential file being accessed from a device associated with an unknown internet protocol (IP) address, a file being shared by a user with permission to access the file to one or more users without permission to access the file, a large number of files being deleted within a particular time period, etc. In response to detecting anomalous activity, SIEM system 115 provides to external system 122 a notification indicating that anomalous activity was detected. External system 122 may be a client device, a SOAR device, etc. Examples of client devices include a computer, a laptop, a tablet, a smart device, a desktop, etc.

External system 122 may provide event analysis system 112 an event query for one or more events that are associated with the detected anomalous activity. The event query may specify at least a start time, an end time, and a tenant. In some embodiments, the event query also specifies one or more event attributes (e.g., location). In some embodiments, the event query also specifies one or more sub-tenants associated with the tenant. A tenant may correspond to a user, an enterprise, a government, a company, an organization, etc. A sub-tenant tenant may correspond to a department associated with the tenant, a user associated with the tenant, a group of individuals associated with the tenant, an organization associated with the tenant, etc.

The events in message queue 113 are not organized in a manner that enables event analysis system 112 to quickly identify the one or more events that satisfy the event query. Event analysis system 112 includes event organizer 117 that ingests events in message queue 113 for organization and storage in data store 116. This enables event analysis system 112 to quickly identify at least a portion of the events that satisfy the event query. Event analysis system 112 includes a corresponding buffer 119 for each tenant. Event organizer 117 ingests, partitions, and copies a set of one or more messages associated with a tenant from message queue 113 to a message buffer 119 associated with the tenant.

In some embodiments, event organizer 117 concurrently ingests messages from the message queue 113 and stores the messages in a corresponding shard of data store 116 while SIEM system 115 analyzes events in message queue 113 to identify anomalous activity. In some embodiments, event organizer 117 ingests messages from message queue 113 and stores the messages in a corresponding shard of data store 116 independent of when SIEM system 115 is analyzing events in message queue 113.

A tenant is associated with one or more tenants. Event organizer 117 analyzes the set of one or more messages in message queue 113 associated with the tenant for storage in data store 116. Data store 116 may include a plurality of shards. In the example shown, data store 116 includes shard 118a and shard 118n, but may include n shards. In some embodiments, data store 116 includes a corresponding shard for each of the tenants. In some embodiments, data store 116 includes a corresponding shard for each sub-tenant associated with a tenant. In some embodiments, a plurality of tenants may be associated with a single shard. Event organizer 117 flushes messages from buffer 119 and stores the messages in the corresponding shard associated with a tenant or sub-tenant. This enables events associated with a particular tenant and/or sub-tenant to be easily identified and retrieved.

When an event query is received from external system 122, query analyzer 114 rewrites the event query into a first component query and a second component query based at least in part on a progress identifier. Event analysis system 112 tracks a data store progress identifier that indicates a most recent event that is stored in a shard associated with a tenant. The data store progress identifier may be a timestamp, a sequence number, or any other identifier that indicates a sequence of an event with respect to other events. The first component query, when performed, identifies one or more events associated with the event query that are stored in data store 116 and the second component query, when performed, identifies one or more events associated with the event query that are stored in message queue 113. In some embodiments, a first component query, when performed, identifies zero events associated with the event query that are stored in data store 116. In some embodiments, the second component query, when performed, identifies zero events associated with the event query that are stored in message queue 113. There is a delay from the time at which an event is stored in message queue 113 and the time at which the event is stored in a shard of data store 116. Query analyzer 114 utilizes the data store progress identifier to identify non-overlapping ranges of events (i.e., disjointed) that include one or more events associated with the query that are stored in data store 116 and to identify one or more events associated with the query that have yet to be stored in data store 116.

In some embodiments, query analyzer 114 queries data store 116 for one or more events associated with a tenant or sub-tenant specified in the query that occurred between the start time specified in the event query to the data store progress identifier associated with the tenant or sub-tenant. Query analyzer 114 may query the message queue for one or more events associated with a tenant or sub-tenant specified in the query that occurred between the progress identifier associated with the tenant or sub-tenant and the end time specified in the event query. This reduces the amount of time and resources needed to respond to the event query because query analyzer 114 utilizes data store 116 to identify at least a portion of the events that satisfy the event query instead of solely relying on message queue 113 to identify all of the events that satisfy the event query. The amount of time and resources needed to identify one or more events that satisfy the event query from data store 116 is less than the amount of time and resources needed to identify one or more events that satisfy the event query from message queue 113.

In some embodiments, an event query includes an event attribute (e.g., location) in addition to a start time, an end time, and a tenant. The lower bound for a first component query is set to the start time included in the event query and the upper bound for a second component query is set to the end time included in the event query. Event analysis system 112 tracks an event attribute progress identifier across primary systems 102a, 102n. The event attribute progress identifier indicates the oldest event having the event attribute that is in a message buffer for any of the tenants. Query analyzer 114 determines whether the event attribute progress identifier precedes the data store progress identifier associated with the tenant that is stored in data store 116. In the event the event attribute progress identifier precedes the data store progress identifier associated with the tenant that is stored in data store 116, then query analyzer 114 rewrites the event query as described above.

However, in the event the event attribute progress identifier does not precede the data store progress identifier associated with the tenant that is stored in data store 116, then query analyzer 114 sets the lower bound for the second component query to be the event attribute progress identifier and sets the upper bound for the first component query to be the data store progress identifier associated with the tenant that is stored in data store 116 associated with the tenant. The gap between the progress identifiers represents a time span where no events relevant to the query occurred. Accordingly, this reduces the number of events for which query analyzer 114 needs to query the message queue. As a result, the amount of time and resources needed to respond to an event query is reduced.

A result of the first component query and a result of the second component query are combined (e.g., a union) to determine a result of the event query. Subsequently, the event query result is provided to external system 122. The event query result provides evidence that the detected anomalous activity may be suspicious to a user associated with external system 122.

FIG. 2 is a flow diagram illustrating an embodiment of ingesting events into a data store. In the example shown, process 200 may be implemented by an event analysis system, such as event analysis system 112.

At 202, a plurality of events is received from one or more primary systems. One or more primary systems associated with one or more different tenants are coupled to an event analysis system. The event analysis system includes an event collector. In some embodiments, the event collector sends a request to a primary system for a set of events. In response, the primary system provides the requested set of events. In some embodiments, a primary system pushes one or more events to the event collector.

At 204, the plurality of events is stored in a message queue. The event analysis system includes a message queue that is coupled to the event collector. The event collector stores the obtained events in the message queue. The events are stored in the message queue in the order in which they are obtained from the one or more primary systems.

At 206, at least a portion of the events in the message queue are ingested for organization and storage in a data store. The events in the message queue are not organized in a manner that enables the event analysis system to quickly identify the one or more events that satisfy an event query. The event analysis system includes an event organizer that ingests at least a portion of the events in the message queue for organization and storage in a data store. This enables the event analysis system to quickly identify at least a portion of the events that satisfy an event query. The event analysis system includes a corresponding buffer for each tenant. The event organizer ingests, partitions the messages, and copies a set of one or more messages associated with a tenant from the message queue to a message buffer associated with the tenant.

A tenant may be associated with one or more sub-tenants. A sub-tenant may correspond to a department associated with the tenant, a user associated with the tenant, a group of individuals associated with the tenant, an organization associated with the tenant, etc. The event organizer analyzes the set of one or more messages in the message buffer associated with the tenant for storage in a data store. The data store includes a corresponding shard for each of the tenants. In some embodiments, the data store includes a corresponding shard for each of the sub-tenants associated with a tenant. This enables events associated with a particular tenant and/or sub-tenant to be easily identified and retrieved. The event organizer flushes messages from the buffer and stores the messages in the corresponding shard. In some embodiments, messages are flushed from the message buffer associated with a tenant to a corresponding shard after a particular amount of time has elapsed. In some embodiments, messages are flushed from the message buffer associated with a tenant to a corresponding shard after a particular number of messages are stored in the message buffer associated with the tenant.

The message queue is coupled to a SIEM system, an event organizer, and a query analyzer. In some embodiments, the SIEM system concurrently analyzes events included in the message queue to identify anomalous activity while the event organizer is ingesting the portion of events in the message queue for organization and storage in the data store. In some embodiments, the SIEM system analyzes events in the message queue independent of when the event organizer is ingesting the portion of events in the message queue for organization and storage in the data store.

At 208, one or more progress identifiers associated with the ingesting of the events in the message queue are tracked. The event analysis system tracks a data store progress identifier that indicates a most recent event that is stored in a shard associated with a tenant. The data store progress identifier may be a timestamp, a sequence number, or any other identifier that indicates a sequence of an event with respect to other events. The data store progress identifier is updated when an event is flushed from a message buffer associated with a tenant to a corresponding shard for a tenant that is part of the tenant.

In some embodiments, the event analysis system separately tracks event attribute progress identifiers for one or more event attributes. In some embodiments, the one or more event attributes that are tracked by the event analysis system may be pre-configured by a user associated with the event analysis system. In some embodiments, the one or more event attributes that are tracked by the event analysis system are learned over time based on event queries received from one or more external systems. For example, the event analysis system may determine the event attributes that are included in event queries more than a first threshold number of times, but less than a second threshold number of times. These event attributes correspond to event attributes that are included in event queries, but do not correspond to frequently queried event attributes. Tracking the progress identifiers for these event attributes when included in an event query may, as described herein, reduce the number of events for which the query analyzer needs to query the message queue. As a result, the amount of time and resources needed to respond to an event query is reduced.

FIG. 3 is a flow diagram illustrating an embodiment of a process for responding to an event query. In the example shown, process 300 may be implemented by an event analysis system, such as event analysis system 112.

At 302, a notification of anomalous activity is provided to an external system. An event analysis system includes a message queue that is coupled to a SIEM system. The SIEM system analyzes events included in the message queue to identify anomalous activity. Examples of anomalous activity include a confidential file being accessed from a device associated with an unknown internet protocol (IP) address, a file being shared by a user with permission to access the file to one or more users without permission to access the file, a large number of files being deleted within a particular time period, etc. In response to detecting anomalous activity, the SIEM system provides to an external system a notification indicating that anomalous activity was detected.

At 304, an event query is received from the external system. The external system may provide the event analysis system an event query for one or more events that are associated with the detected anomalous activity. The event query may specify at least a start time, an end time, and a tenant. In some embodiments, the event query also specifies one or more event attributes (e.g., location). In some embodiments, the event query also specifies one or more sub-tenants associated with the tenant.

At 306, the event query is rewritten into a first component query and a second component query. The events in the message queue are not organized in a manner that enables the event analysis system to quickly identify the one or more events that satisfy the event query. When an event query is received from an external system, a query analyzer of the event analysis system rewrites the event query into a first component query and a second component query based at least in part on a data store progress identifier. The first component query identifies one or more events associated with the event query that are stored in the data store and the second component query identifies one or more events associated with the event query that are stored in the message queue. There is a delay from the time at which an event is stored in the message queue and the time at which the event is stored in a shard of the data store. As a result, querying the data store alone may provide an incomplete answer. The query analyzer utilizes the data store progress identifier (e.g., the progress identifier determined at step 208 of FIG. 2) to identify one or more events associated with the query that are stored in the data store and to identify one or more events associated with the query that have yet to be stored in the data store.

At 308, the first component query and the second component query are performed. The query analyzer queries the data store for events that occurred within the lower and upper bounds associated with the first component query. The query analyzer queries the message queue for events that occurred within the lower and upper bounds associated with the second component query.

At 310, the result of the first component query and the result of the second component query are combined to determine the result of the event query. The result of the event query is a union of the first component query result and the second component query result.

At 312, a result of the event query is provided to the external system. The event query result provides evidence that the detected anomalous activity may be suspicious to a user associated with the client device.

FIG. 4 is a flow diagram illustrating an embodiment of a process for rewriting an event query. In the example shown, process 400 may be implemented by an event analysis system, such as event analysis system 112. In some embodiments, process 400 is implemented to perform some of step 306 of process 300.

An event query is received from an external system. The event query specifies at least a start time, an end time, and a tenant. For example, an event query may request for events associated with tenant 1 having a start time of 12:00 PM and an end time of 2:15 PM. In some embodiments, the event query also includes a sub-tenant.

At 402, a lower bound for a first component query is determined. The lower bound for the first component query corresponds to the start time included in the event query. For example, 12:00 PM is set to the lower bound for the first component query.

At 404, a data store progress identifier associated with the tenant specified in the event query is determined. Each event has a corresponding data store progress identifier. For example, the data store progress identifier that indicates a most recent event that is stored in a data store associated with tenant 1 may be 1:00 PM.

At 406, the upper bound for the first component query and a lower bound for the second component query are set to be the data store progress identifier associated with the most recent event. The upper bound for the first component query may be set to 1:00 PM and the lower bound for the second component query may be set to 1:00 PM.

At 408, an upper bound for a second component query is determined. The upper bound for the second component query corresponds to the end time included in the event query. The upper bound for the second component query may be set to be 2:15 PM.

Figure 5:
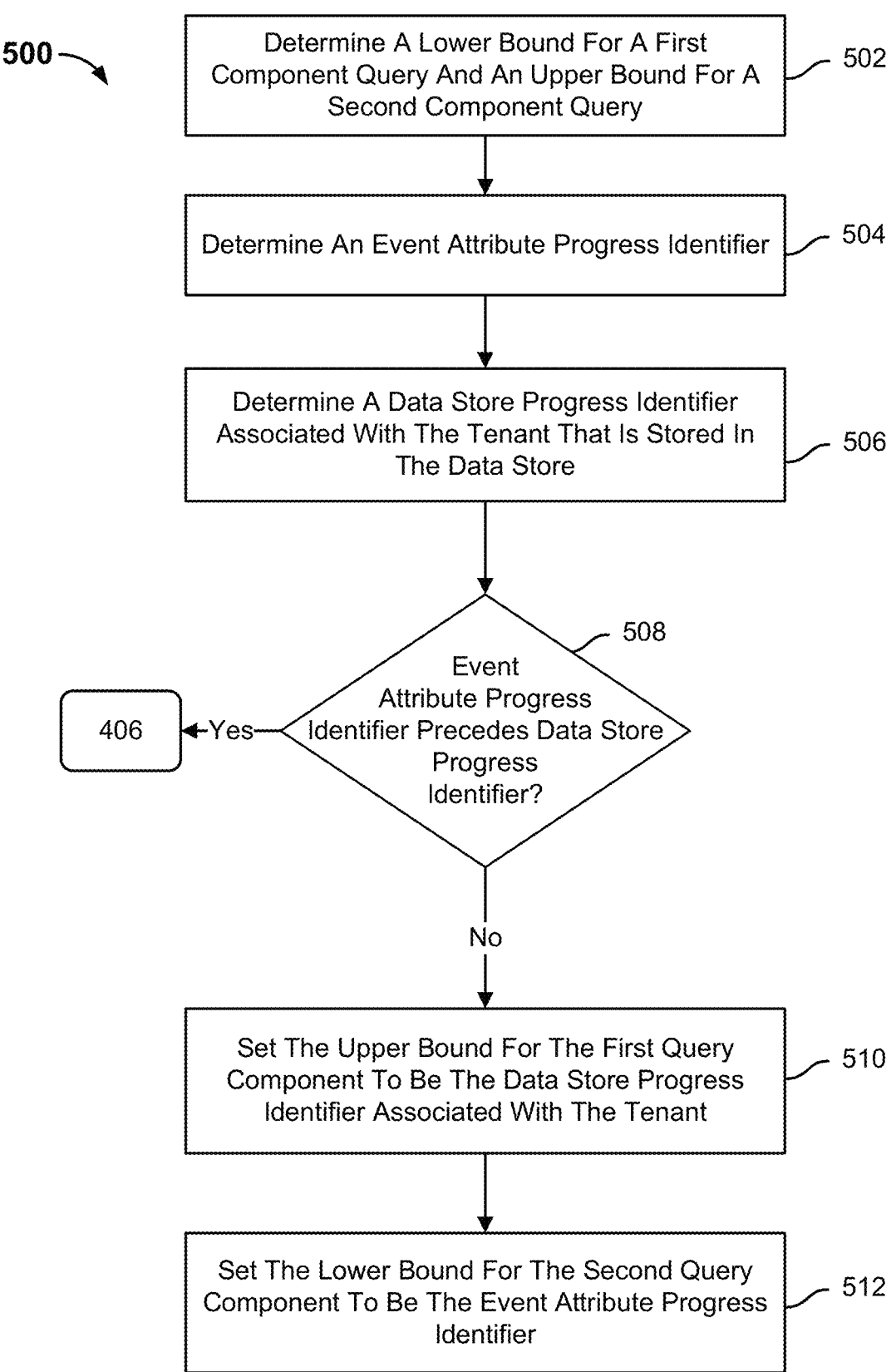
FIG. 5 is a flow diagram illustrating an embodiment of a process for rewriting an event query.

FIG. 5 is a flow diagram illustrating an embodiment of a process for rewriting an event query. In the example shown, process 500 may be implemented by an event analysis system, such as event analysis system 112. In some embodiments, process 500 is implemented to perform some of step 306 of process 300.

An event query is received from an external system. The event query specifies at least a start time, an end time, an event attribute, and a tenant. For example, the event query may request for events associated with tenant 1 having a start time of 12:00 PM, an end time of 2:15 PM (e.g., the current time), and an event attribute of location 1. In some embodiments, the event query also includes a sub-tenant.

At 502, a lower bound for a first component query and an upper bound for a second component query are determined. The lower bound for the first component query is determined to be the start time included in the event query. The upper bound for the second component query is determined to be the end time included in the event query. The lower bound for the first component query may be set to 12:00 PM and the upper bound for the second component query may be set to 2:15 PM.

At 504, an event attribute progress identifier is determined. The event analysis system tracks the event attribute progress identifier across the one or more primary systems to which the event analysis system is coupled. The event attribute progress identifier indicates the oldest event having the event attribute that is in a message buffer for any of the tenants.

The event attribute progress identifier associated with the event attribute of "location 1" may be 2:00 PM. This progress identifier is the event attribute progress identifier for the oldest event having the event attribute of "location 1" that is in a message buffer for any of the tenants. For example, an event having an event attribute of "location 1" may be in a message buffer for tenant 2.

At 506, a data store progress identifier associated with the tenant that is stored in the data store is determined. The data store progress identifier for the most recent event associated with tenant 1 that is stored in a data store associated with tenant 1 may be 1:00 PM (e.g., the last time events were flushed by the event organizer from the message buffer associated with tenant 1).

At 508, it is determined whether the event attribute progress identifier precedes the data store progress identifier associated with the tenant that is stored in the data store.

In the event the event attribute progress identifier does not precede the data store progress identifier associated with the tenant that is stored in the data store, process 500 proceeds to 510.

In the event the event attribute progress identifier precedes the data store progress identifier associated with the tenant that is stored in the data store, process 500 proceeds to step 406 of process 400.

At 510, the upper bound for the first component query is set to be the data store progress identifier associated with the tenant that is stored in a data store associated with the tenant. The upper bound for the first component query may be set to 1 PM.

At 512, the lower bound for the second component query is set to be the event attribute progress identifier. The lower bound for the second component query may be set to 2 PM.

In this example, the amount of time and resources needed to respond to the event query were reduced because the event analysis system did not need to query the message queue for events that occurred between 1 PM and 2 PM. The gap between the progress identifiers represents a time span where no events relevant to the query occurred. Accordingly, this reduces the number of events for which the query analyzer needs to query the message buffer. As a result, the amount of time and resources needed to respond to an event query is reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

This disclosure includes the following examples.

Example 1—A method, comprising: receiving events from one or more primary systems associated with one or more tenants; storing the received events in a message queue; ingesting at least a portion of the events in the message queue for organization and storage in a data store; tracking one or more progress identifiers associated with ingesting of the events in the message queue; receiving an event query from an external system; rewriting the event query into a first component query for the data store and a second component query for the message queue based at least in part on a progress identifier; and combining a result of the first component query and a result of the second component query to determine a result of the event query.

Example 2—The method of example 1, further comprising: performing the first component query and the second component query; and providing the result of the event query to the external system.

Example 3—The method of example 1, further comprising providing a notification of anomalous behavior to the external system.

Example 4—The method of example 1, wherein each of the events received from the one or more primary systems associated with the one or more tenants has a corresponding progress identifier.

Example 5—The method of example 1, wherein each of the one or more tenants is associated with a corresponding shard in the data store.

Example 6—The method of example 1, wherein ingesting at least the portion of the events in the message queue includes copying one or more events associated with a tenant of the one or more tenants from the message queue to a buffer corresponding to the tenant.

Example 7—The method of example 6, wherein ingesting at least the portion of the events in the message queue includes flushing one or more events from the buffer corresponding to the tenant to one or more shards associated with the tenant.

Example 8—The method of example 7, wherein the one or more events are flushed after a threshold number of events have accumulated in the buffer corresponding to the tenant.

Example 9—The method of example 7, wherein the one or more events are flushed after a particular period of time has passed.

Example 10—The method of example 1, wherein the event query at least includes a start time, an end time, and a tenant.

Example 11—The method of example 10, wherein a lower bound for the first component query is set to the start time.

Example 12—The method of example 10, wherein an upper bound for the second component query is set to the end time.

Example 13—The method of example 10, wherein one of the one or more progress identifiers associated with ingesting of the events in the message queue is a data store progress identifier for a most recent event that is stored for the tenant in the data store.

Example 14—The method of example 13, wherein an upper bound for the first component query and a lower bound for the second component query are set to the data store progress identifier for the most recent event that is stored for the tenant in the data store.

Example 15—The method of example 13, wherein the event query further includes an event attribute.

Example 16—The method of example 15, wherein the event attribute is associated with an event attribute progress identifier that indicates an oldest event having the event attribute that is in a corresponding message buffer for the one or more tenants.

Example 17—The method of example 16, further comprising determining whether an event attribute progress identifier precedes the data store progress identifier for the most recent event that is stored for the tenant in the data store.

Example 18—The method of example 16, in response to determining that the event attribute progress identifier does not precede the data store progress identifier for the most recent event that is stored for the tenant in the data store, setting an upper bound for the first component query as the data store progress identifier for the most recent event that is stored for the tenant in the data store and setting a lower bound for the second component query as the event attribute progress identifier.

Example 19—A computer program product embodied in a non-transitory computer readable medium and comprising computer instructions for: receiving events from one or more primary systems associated with one or more tenants; storing the received events in a message queue; ingesting at least a portion of the events in the message queue for organization and storage in a data store; tracking one or more progress identifiers associated with ingesting of the events in the message queue; receiving an event query; rewriting the event query into a first component query for the data store and a second component query for the message queue based at least in part on a progress identifier; and combining a result of the first component query and a result of the second component query to determine a result of the event query.

Example 20—A system, comprising: a memory; and a processor coupled to the memory, wherein the processor: receives events from one or more primary systems associated with one or more tenants; stores the received events in a message queue; ingests at least a portion of the events in the message queue for organization and storage in a data store; tracks one or more progress identifiers associated with ingesting of the events in the message queue; receives an event query; rewrites the event query into a first component query for the data store and a second component query for the message queue based at least in part on a progress identifier; and combines a result of the first component query and a result of the second component query to determine a result of the event query.

What is claimed is:

1. A method, comprising:
obtaining events from one or more primary systems associated with one or more tenants;
storing the events in a message queue;
identifying a portion of the events in the message queue for organization and storage in a data store;
tracking progress identifiers associated with the portion of the events in the message queue;
flushing the portion of the events from the message queue into a shard of the data store corresponding to a tenant among the one or more tenants;
receiving, from an external system, an event query associated with the tenant;
rewriting the event query associated with the tenant into a first component query for the shard of the data store corresponding to the tenant and a second component query for the message queue based at least in part on the progress identifiers associated with the portion of the events in the message queue, wherein the shard of the data store corresponding to the tenant enables the events stored in the shard associated with the tenant to be identified and retrieved in less time than events associated with the tenant within the message queue; and
outputting, responsive to the event query associated with the tenant, a combined result using a result of the first component query and a result of the second component query.

2. The method of claim 1, further comprising:
wherein the progress identifiers indicate a most recent event that is stored in the shard of the data store corresponding to the tenant.

3. The method of claim 1, further comprising:
performing the first component query;
performing the second component query; and
returning the combined result to the external system as a response to the event query associated with the tenant.

4. The method of claim 1, wherein each of the events obtained from the one or more primary systems associated with the one or more tenants has a corresponding progress identifier.

5. The method of claim 1, wherein each of the one or more tenants is associated with a corresponding shard in the data store.

6. The method of claim 1, further comprising:
identifying the portion of the events in the message queue; and
copying one or more events associated with the tenant among the one or more tenants from the message queue to a buffer corresponding to the tenant.

7. The method of claim 6, further comprising:
flushing one or more of the events from the buffer into shards corresponding to each of the respective one or more tenants.

8. The method of claim 7, wherein the one or more events for each of the respective one or more tenants are flushed after a threshold number of events have accumulated in the buffer corresponding to the tenant.

9. The method of claim 7, wherein the one or more events for each of the respective one or more tenants are flushed after a configurable period of time.

10. The method of claim 1, wherein the event query associated with the tenant at least includes a start time, an end time, and the tenant.

11. The method of claim 10, wherein a lower bound for the first component query is set to the start time.

12. The method of claim 10, wherein an upper bound for the second component query is set to the end time.

13. The method of claim 10, wherein an upper bound for the first component query and a lower bound for the second component query are set to one of the progress identifiers corresponding to a most recent event that is stored for the tenant in the data store.

14. The method of claim 10, wherein the event query associated with the tenant further includes an event attribute.

15. The method of claim 14, wherein the event attribute is associated with an event attribute progress identifier that indicates an oldest event having the event attribute that is in a corresponding message buffer for the one or more tenants.

16. The method of claim 15, further comprising determining whether an event attribute progress identifier precedes the one of the progress identifiers corresponding to a most recent event that is stored for the tenant within the shard of the data store corresponding to the tenant.

17. The method of claim 16, further comprising:
responsive to determining that the event attribute progress identifier does not precede the one of the progress identifiers corresponding to the most recent event that is stored for the tenant in the data store, setting an upper bound for the first component query as the one of the progress identifiers corresponding to the most recent event that is stored within the shard of the data store corresponding to the tenant and setting a lower bound for the second component query as the event attribute progress identifier.

18. A computer program product embodied in a non-transitory computer readable medium and comprising computer instructions for:

obtaining events from one or more primary systems associated with one or more tenants;

storing the events in a message queue;

identifying a portion of the events in the message queue for organization and storage in a data store;

tracking progress identifiers associated with the portion of the events in the message queue;

flushing the portion of the events from the message queue into a shard of the data store corresponding to a tenant among the one or more tenants;

receiving, from an external system, an event query associated with the tenant;

rewriting the event query associated with the tenant into a first component query for the shard of the data store corresponding to the tenant and a second component query for the message queue based at least in part on the progress identifiers associated with the portion of the events in the message queue, wherein the shard of the data store corresponding to the tenant enables the events stored in the shard associated with the tenant to be identified and retrieved in less time than events associated with the tenant within the message queue; and outputting, responsive to the event query associated with the tenant, a combined result using a result of the first component query and a result of the second component query.

19. A system, comprising:

a memory; and processing circuitry in communication with the memory, the processing circuitry configured to:

obtain, by the processing circuitry, events from one or more primary systems associated with one or more tenants;

store, by the processing circuitry, the events in a message queue;

identify, by the processing circuitry, a portion of the events in the message queue for organization and storage in a data store;

track, by the processing circuitry, progress identifiers associated with the portion of the events in the message queue;

flush, by the processing circuitry, the portion of the events from the message queue into a shard of the data store corresponding to a tenant among the one or more tenants;

receive, by the processing circuitry from an external system, an event query associated with the tenant;

rewrite, by the processing circuitry, the event query associated with the tenant into a first component query for the shard of the data store corresponding to the tenant and a second component query for the message queue based at least in part on the progress identifiers associated with the portion of the events in the message queue, wherein the shard of the data store corresponding to the tenant enables the events stored in the shard associated with the tenant to be identified and retrieved in less time than events associated with the tenant within the message queue; and output, by the processing circuitry and responsive to the event query associated with the tenant, a combined result using a result of the first component query and a result of the second component query.

20. The system of claim 19, wherein the processing circuitry is further configured to:

execute the first component query;

execute the second component query; and return the combined result to the external system as a response to the event query associated with the tenant.

* * * * *